(12) United States Patent
Seader

(10) Patent No.: US 10,744,924 B2
(45) Date of Patent: Aug. 18, 2020

(54) SYSTEMS AND METHODS FOR AN INLINE DUAL CAM TENSIONING DEVICE

(71) Applicant: Nite Ize, Inc., Boulder, CO (US)

(72) Inventor: Rex Seader, Denver, CO (US)

(73) Assignee: Nite Ize, Inc., Boulder, CO (US)

(*) Notice: Subject to any disclaimer, the term of this patent is extended or adjusted under 35 U.S.C. 154(b) by 0 days.

(21) Appl. No.: 15/382,396

(22) Filed: Dec. 16, 2016

(65) Prior Publication Data
US 2017/0182928 A1    Jun. 29, 2017

Related U.S. Application Data

(60) Provisional application No. 62/387,302, filed on Dec. 23, 2015.

(51) Int. Cl.
*B60P 7/08* (2006.01)
*A44B 11/12* (2006.01)

(52) U.S. Cl.
CPC .......... *B60P 7/0823* (2013.01); *A44B 11/125* (2013.01)

(58) Field of Classification Search
CPC ..... B60P 7/0838; B60P 7/0869; B60P 7/0823; Y10T 24/3429; Y10T 24/3436; Y10T 24/3441; Y10T 24/3951; Y10T 24/44368; Y10T 21/2175; Y10T 21/394; Y10T 24/2117; Y10T 24/2192; Y10T 24/3953; Y10T 24/3405; Y10T 24/3407; Y10T 24/3433; Y10T 24/3443; A63B 21/0557
See application file for complete search history.

(56) References Cited

U.S. PATENT DOCUMENTS

| 1,958,160 A | * | 5/1934 | Cherico et al. | A41B 3/08 |
| | | | | 24/331 |
| 1,996,024 A | * | 3/1935 | Mix | A41B 3/08 |
| | | | | 24/331 |
| 2,653,365 A | | 9/1953 | Elsner | |

(Continued)

FOREIGN PATENT DOCUMENTS

| JP | 10-119611 | | 5/1998 |
| JP | 11171236 A | * | 6/1999 |
| WO | 2011/039856 | | 4/2011 |

OTHER PUBLICATIONS

International Search Report and Written Opinion dated Mar. 3, 2017 in co-pending PCT Application No. PCT/US2016/067365 filed Dec. 16, 2016, (13 pages).

(Continued)

*Primary Examiner* — Victor D Batson
*Assistant Examiner* — Matthew J Sullivan
(74) *Attorney, Agent, or Firm* — Haynes and Boone, LLP

(57) ABSTRACT

A flat strap holding apparatus includes a chassis and a first and second rotating hub that rotate in the interior of the chassis. The interior of the chassis being bounded by two opposing side walls of the chassis and a plurality of cross bars adjoined to the side walls. The chassis has a first and second end, each end containing the first and second rotating hub. A gripping surface of each rotating hub is proximate to a first and second gripping area in the interior of the chassis residing on the plurality of chassis cross bars. The first and second grip areas are arranged approximately orthogonal to one another. The first and second rotating hubs are arranged to rotate towards and away from the first and second gripping areas.

18 Claims, 13 Drawing Sheets

(56) References Cited

U.S. PATENT DOCUMENTS

| | | | | |
|---|---|---|---|---|
| 2,681,401 A * | 6/1954 | Anderson | ............... | B23K 9/167 219/137.2 |
| 4,125,115 A * | 11/1978 | Mayo | ................. | A61B 17/1327 24/311 |
| 4,987,654 A | 1/1991 | Mejias | | |
| 5,401,011 A * | 3/1995 | Gatenby | ................. | B25B 13/52 269/131 |
| 5,423,644 A * | 6/1995 | First, Sr. | ................. | A44B 11/14 24/68 CD |
| 5,661,877 A * | 9/1997 | Bloomer | ................. | A44B 11/12 24/170 |
| 5,697,594 A * | 12/1997 | Adams | ................. | A47B 21/045 24/331 |
| 6,543,096 B2 * | 4/2003 | Settelmayer | ........... | A44B 11/12 24/170 |
| 6,941,620 B1 * | 9/2005 | Hinds | .................... | A44B 11/02 24/134 KA |
| 6,966,534 B2 * | 11/2005 | Kamenstein | ............. | A47G 1/18 188/65.1 |
| 7,337,504 B1 * | 3/2008 | Casey | .................... | B63B 21/08 114/218 |
| 8,079,116 B2 * | 12/2011 | Ayers | .................... | B60P 7/0869 150/154 |
| 8,387,217 B1 * | 3/2013 | Hinds | ............... | A63B 21/00065 24/134 R |
| 8,407,865 B2 * | 4/2013 | Bateman | .................. | B25B 25/00 24/170 |
| 8,789,485 B2 * | 7/2014 | Juenger | .................... | B63B 21/04 114/199 |
| 9,127,748 B1 * | 9/2015 | Ohler | ....................... | F16G 11/10 |
| 9,139,126 B2 * | 9/2015 | Dickey | ..................... | B60P 7/08 |
| 2010/0137112 A1 * | 6/2010 | Harker | ............... | A63B 21/0552 482/92 |
| 2010/0275420 A1 * | 11/2010 | Huang | .................. | B60P 7/0838 24/68 CD |
| 2013/0326848 A1 * | 12/2013 | Strahl | ................... | B60P 7/0823 24/69 ST |
| 2015/0016916 A1 | 1/2015 | Dickey | | |

OTHER PUBLICATIONS

European Search Report dated Jul. 16, 2019 issued in related European Patent App. No. 16879913.8 (9 pages).

Office Action issued in parallel Japanese Patent App. No. 2018-533206 dated Oct. 2, 2019 (11 pages with English translation).

* cited by examiner

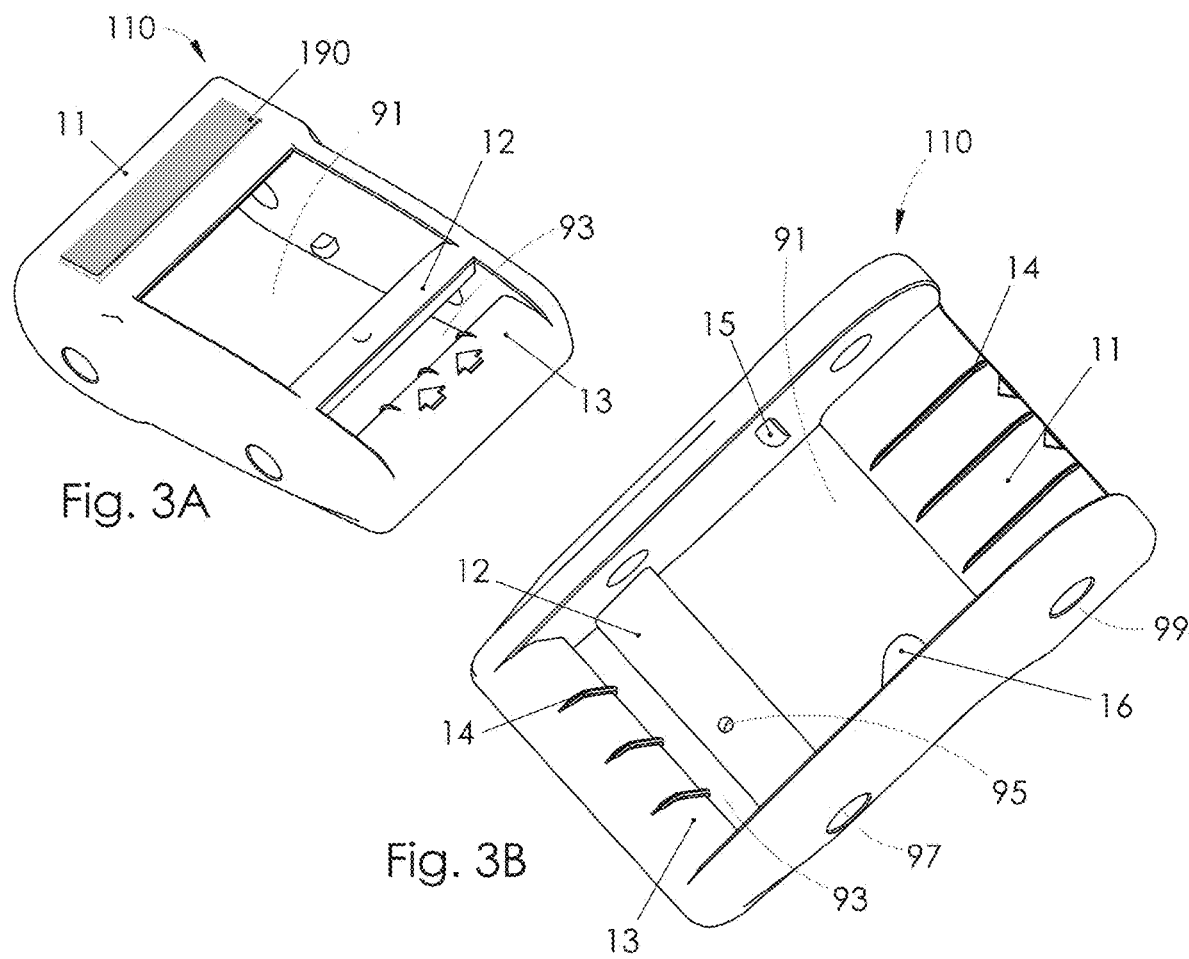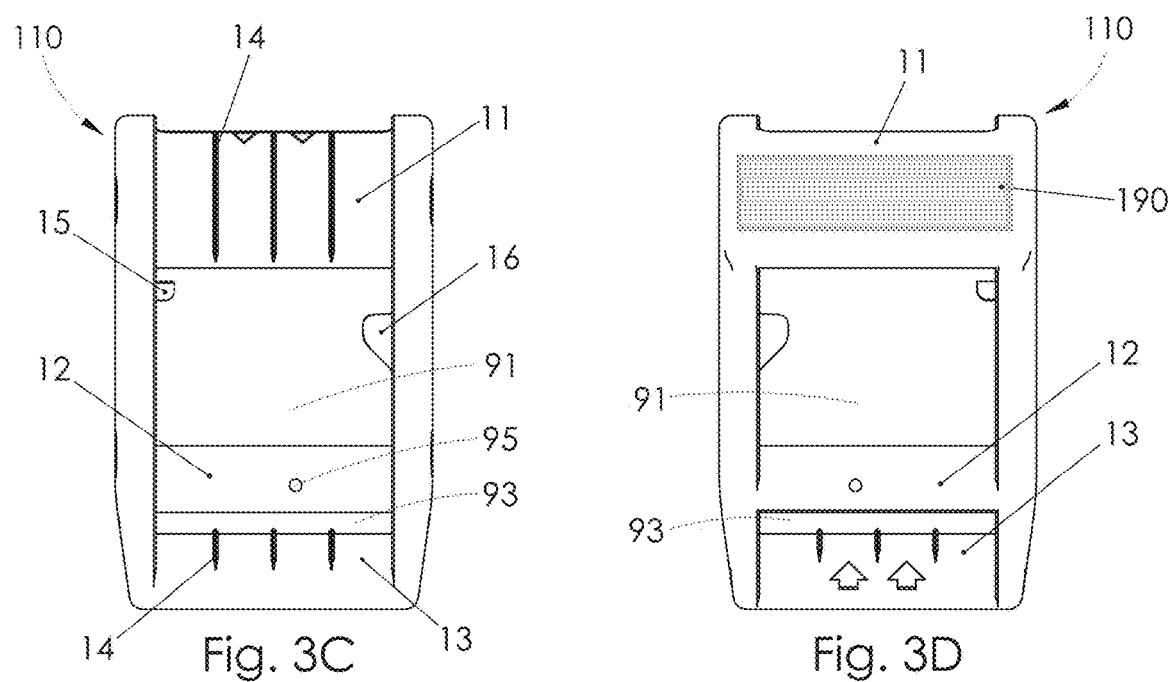

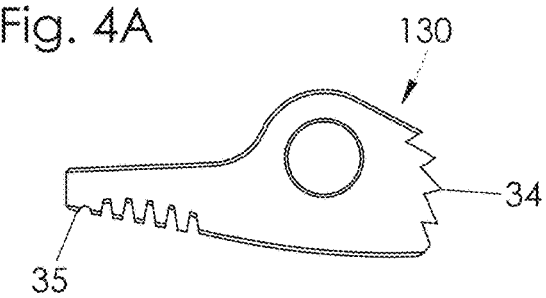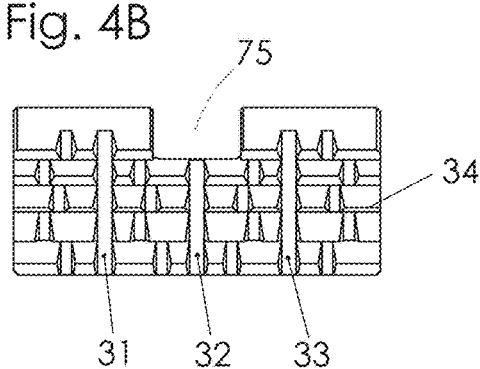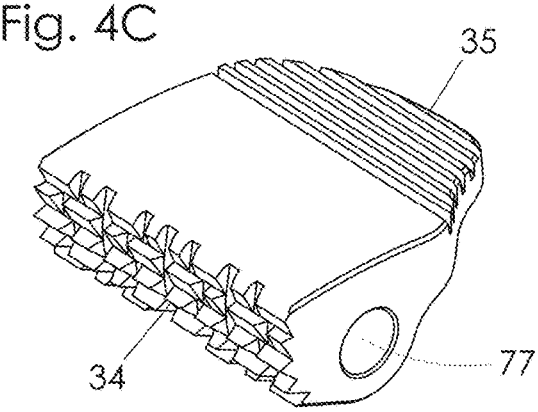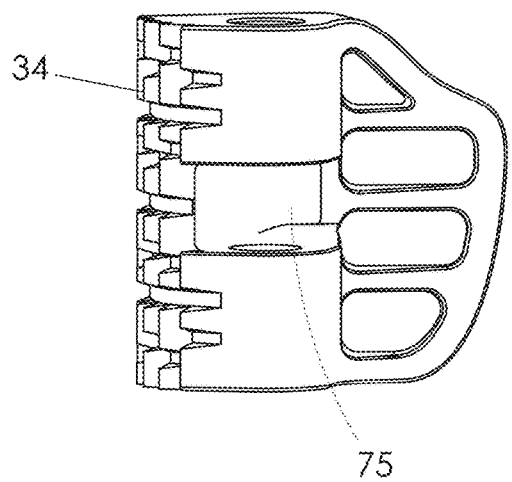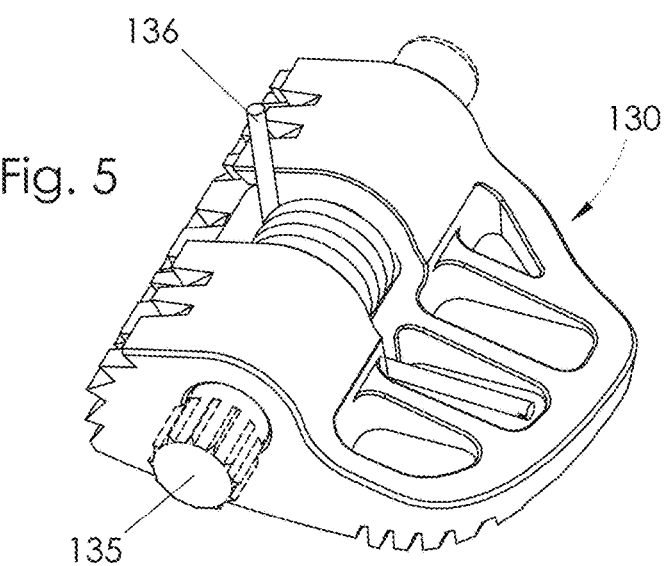

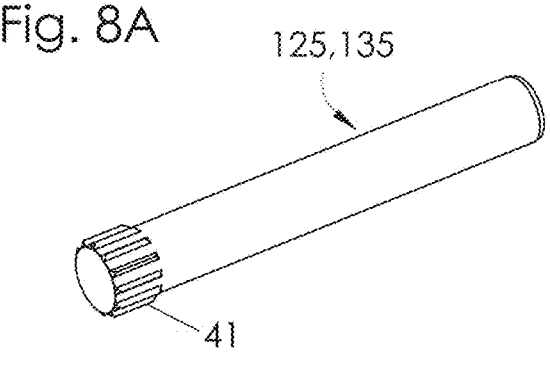
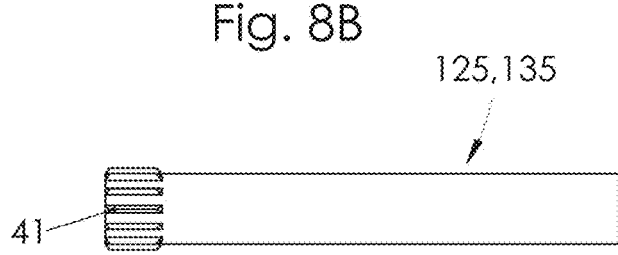
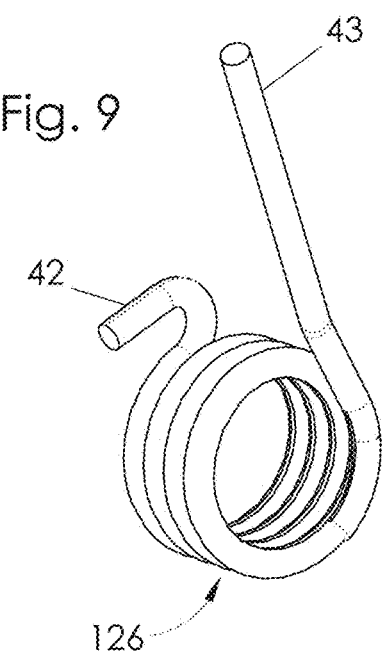
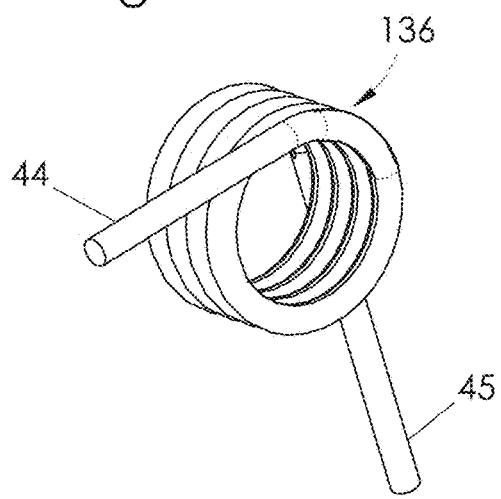

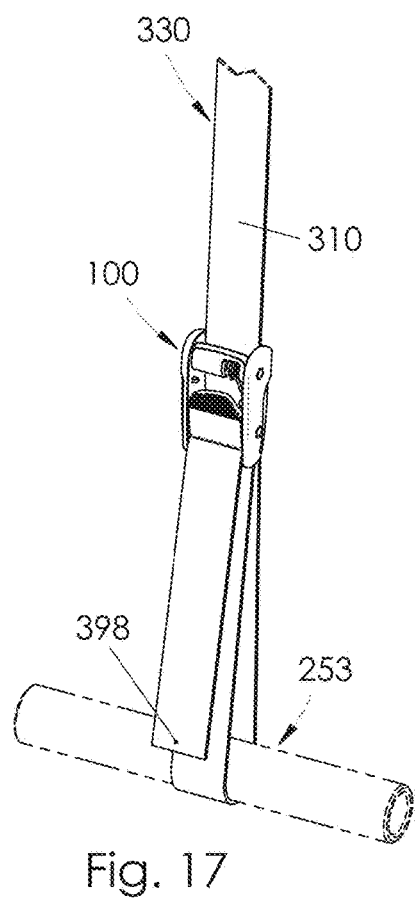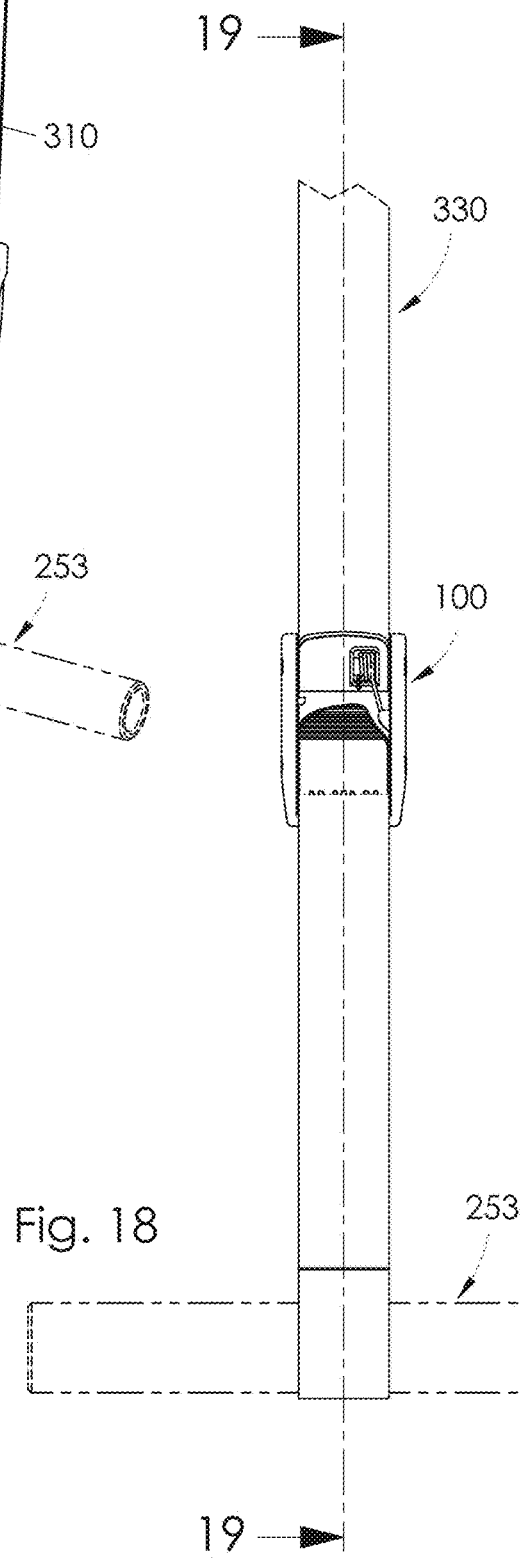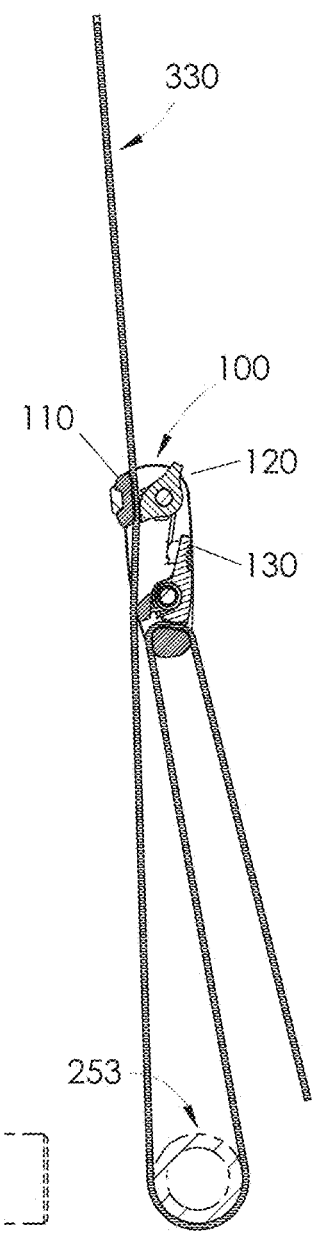
Fig. 17
Fig. 18
Fig. 19

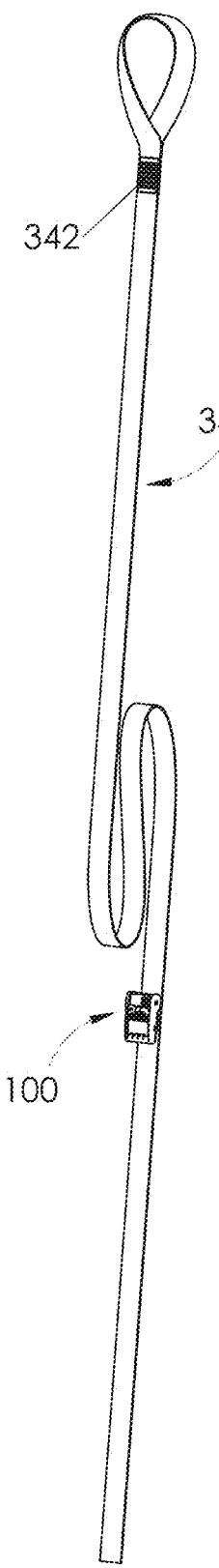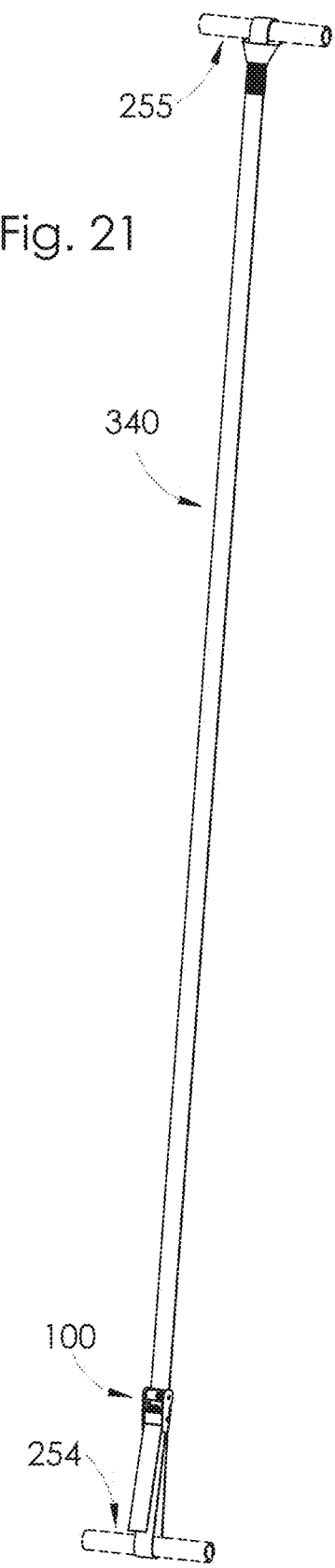

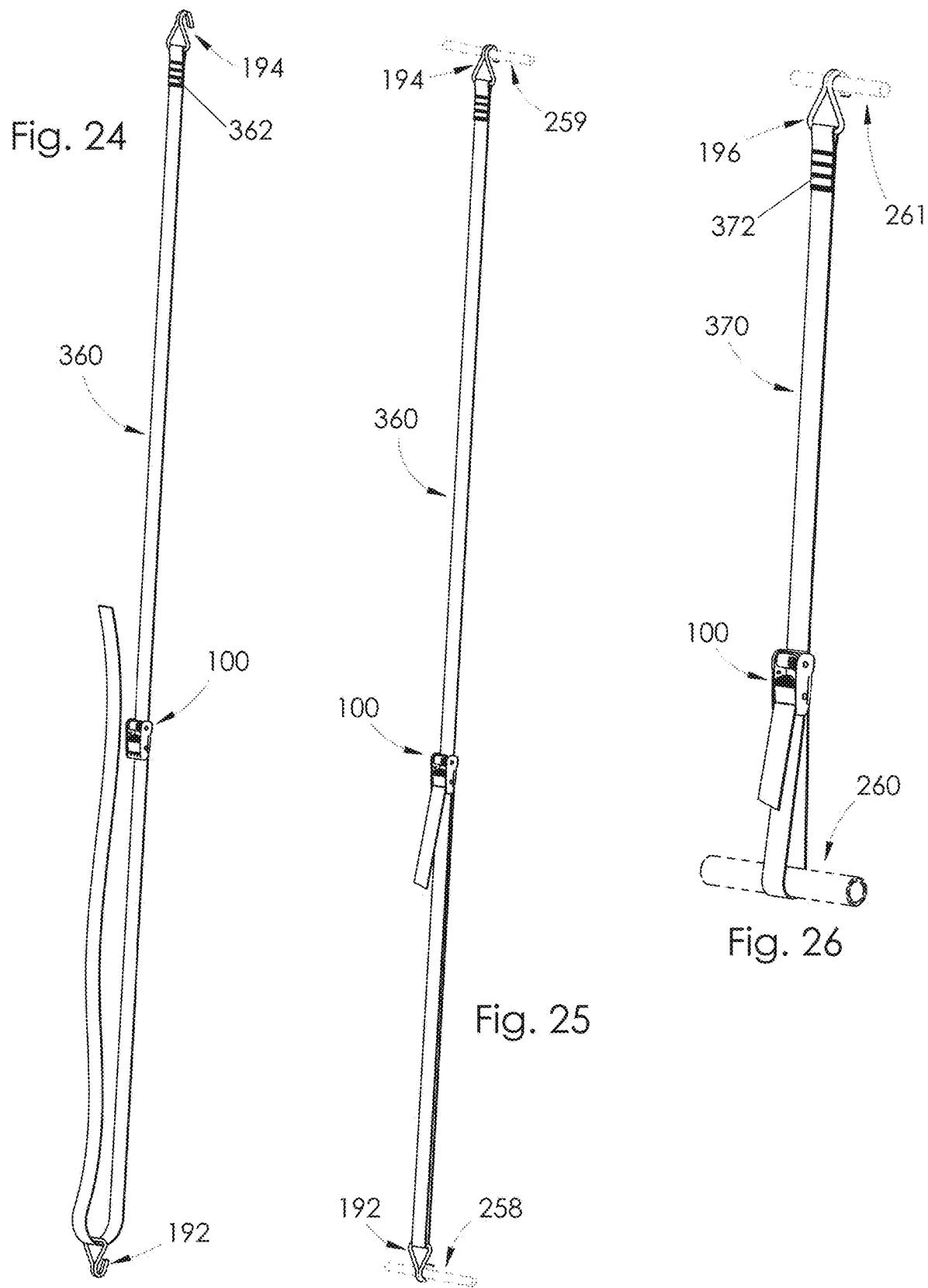

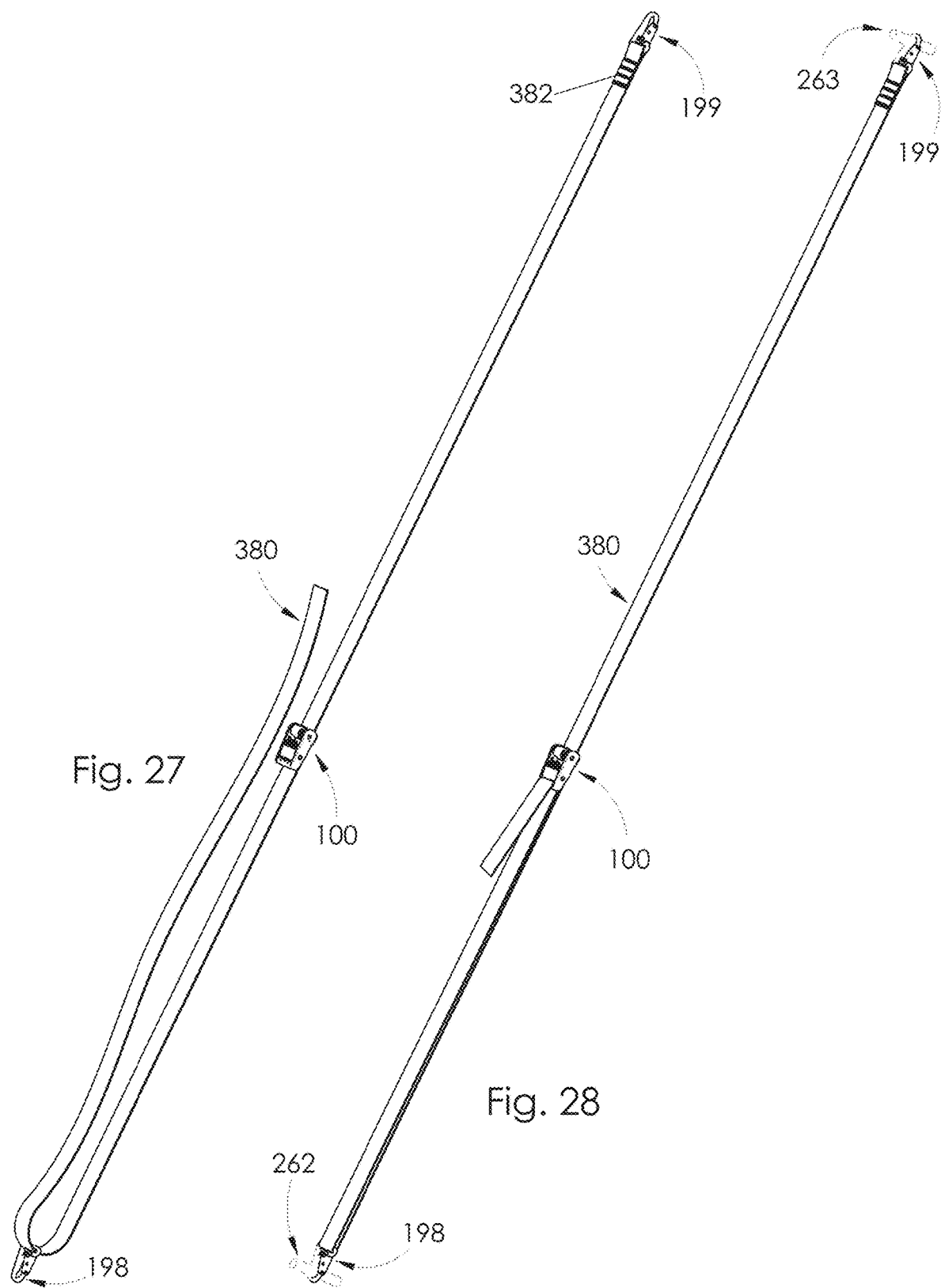

SYSTEMS AND METHODS FOR AN INLINE DUAL CAM TENSIONING DEVICE

CROSS REFERENCE TO RELATED APPLICATION

This application claims the benefit of U.S. Provisional Patent Application 62/387,302 filed Dec. 23, 2015, and hereby incorporated by reference to the same extent as though fully disclosed herein.

BACKGROUND

This application relates to apparatuses used with flat strap (webbing), specifically apparatuses and methods of using apparatuses to secure flat strap or to secure objects using flat strap.

Devices common to industries that utilize flat straps for securing loads usually encompass two broad areas of devices; sewn-strap camlock devices and lever ratcheting devices. Sewn-strap camlock devices utilize a strap permanently attached to the device by means of a loop sewn in one end of the strap affixed through an opening in the device housing with the opposing free end locked within the device by means of an eccentrically shaped hub rotated to trap the free end of the strap between the hub and the device housing. Lever ratcheting devices also incorporate a permanently attached section of strap to the device and a second non-permanently attached strap drawn into and captured on a hub within the device by means of a ratcheting lever mechanism. Sewn-strap camlock devices are commonly used in loop configurations where the strap surrounds objects being secured, binding them together and possibly to a stationary anchor if also encompassed by the strap as the free end of the strap is drawn into and held within the device. Ratchet devices more typically are used in point-to-point configurations where objects are confined between a stationary surface and a highly tensioned strap (ratchet lever induced) spanning the distance between two anchored points securely attached to the underlying surface. Ratchet mechanisms tend to be much larger in size than the simpler camlock devices but typically can induce far more load securing tension in the strap. In both types of devices a section of strap is in one way or another permanently attached to the device and will render both types of devices unusable if that section of strap breaks or is damaged in some manner.

Additionally, with one end or one strap permanently attached to the device, the device is limited to utilizing the attached strap. As such, would limit the device in the case of a sewn strap camlock to a single length of strap and in both types of devices to a particular strap material, thickness and hence strength and durability. In most cases the load bearing limits are determined by the intrinsic load bearing capacity of the strap material utilized with the device.

Because of design and structural differences between the two styles of device, a user is either limited to the simpler, smaller, easier to use sewn-strap camlock device or to the larger, unwieldly, more complicated higher tensioning capacity ratchet device.

And in both cases, with the strap permanently attached to the device, the sewn-strap camlock and the lever ratcheting devices are themselves positionally limited in any configured load bearing arrangement. For sewn-strap camlocks the tensioning device is confined to one end of the strap. For lever ratcheting devices the length of the permanently attached section of strap determines the physical position of the ratchet device. Tensioning of the configured strap arrangement is then induced by drawing strap into the fixed location device.

SUMMARY

Embodiments of the apparatuses described herein alleviate the issues related to devices with permanently attached straps in that the strap remains removable from the apparatus. Embodiments of the apparatuses incorporate a means to accommodate straps encompassing a range of thicknesses making the interchangeability of straps a more valued asset compared to devices optimized to accommodate a single strap thickness. Embodiments of the apparatuses described herein also provide means for amplifying tensioning capability within the apparatus making it much closer in function to the high tensioning capability of ratchet styled devices yet remaining much closer in size to the smaller sewn-strap camlock styled devices.

Interchangeability of straps combined with the means of tension amplification incorporated into in a small proportioned apparatus which can be conveniently positioned anywhere along the strap in a configured load bearing application together form a synergy of functionality and ease of use that to date have not been employed by other adjustable strap devices.

In one embodiment, a flat strap holding apparatus includes a chassis, the chassis including a first gripping area and a second gripping area. The apparatus further includes a first rotating hub, mounted in the chassis, the first rotating hub including a first gripping surface, the first gripping surface oriented such when the first rotating hub rotates the first gripping surface is opposed to the first gripping area. The apparatus further includes a second rotating hub, mounted in the chassis, the second rotating hub including a second gripping surface, the second gripping surface oriented such when the second rotating hub rotates the second gripping surface is opposed to the second gripping area. The first gripping surface of the first rotating hub rotates towards the first gripping area when the first rotating hub is rotated in a first direction and the second gripping surface of the second rotating hub rotates towards the second gripping area when the second rotating hub is rotated in the first direction. In one alternative, the first and second gripping area are approximately orthogonal to each other. In another alternative, the chassis has a first and second side. Furthermore, the first gripping area and the first gripping surface form a first gripping point and the second gripping area and the second gripping surface form a second gripping point. Additionally, the first gripping point has a first entrance and a first exit, the first entrance at a first expected entrance point for a flat strap and the first exit at a first expected exit point for the flat strap, and the second gripping point has a second entrance and a second exit, the second entrance at a second expected entrance point for the flat strap and the second exit at a second expected exit point for the flat strap. Finally, the first exit and the second entrance are on the first side of the chassis. Optionally, the first side of the chassis includes a guard strip. Alternatively, the first and second gripping areas include a plurality of ridges and the first and second gripping surfaces include a plurality of mating valleys, the plurality of ridges aligned in a complementary fashion with the plurality of mating valleys. In one configuration, the first and second gripping surfaces each include a gripping pattern. Optionally, the gripping pattern is a non-regular pattern of directional tabs. Alternatively, the directional tabs are shaped such that the directional tabs form an inclined plane in relation to the first entrance and the second entrance, such that the flat strap is ramped over the directional tabs upon insertion. In another alternative, the directional tabs are shaped such that the directional tabs form an approximately perpendicular plane in relation to the first exit and the second exit.

In one embodiment, a flat strap holding apparatus includes a chassis, the chassis including a first gripping area and a second gripping area. The apparatus further includes a first camlock, mounted in the chassis, the first camlock normally closed, the first camlock including a first gripping surface, the first gripping surface oriented such when the first camlock rotates the first gripping surface is opposed to the first gripping area. The apparatus further includes a second camlock, mounted in the chassis, the second camlock normally closed, the second camlock including a second gripping surface, the second gripping surface oriented such when the second camlock rotates the second gripping surface is opposed to the second gripping area. The first gripping surface of the first camlock rotates towards the first gripping area when the first camlock is rotated in a first direction and the second gripping surface of the second camlock rotates towards the second gripping area when the second camlock is rotated in the first direction. In one alternative, the chassis has a first and second side. Furthermore, the first gripping area and the first gripping surface form a first gripping point and the second gripping area and the second gripping surface form a second gripping point. Additionally, the first gripping point has a first entrance and a first exit, the first entrance at a first expected entrance point for a flat strap and the first exit at a first expected exit point for the flat strap, and the second gripping point has a second entrance and a second exit, the second entrance at a second expected entrance point for the flat strap and the second exit at a second expected exit point for the flat strap. Finally, the first exit and the second entrance are on the first side of the chassis. Optionally, the first camlock locks if the flat strap is fed first through the first expected entrance point and the second camlock locks if the flat strap is fed first through the second expected entrance point. Alternatively, the first and second gripping area are approximately orthogonal to each other.

In one embodiment, a method of using a flat strap includes providing a flat strap holding apparatus. The flat strap holding apparatus includes a chassis, the chassis including a first gripping area and a second gripping area. The apparatus further includes a first rotating hub, mounted in the chassis, the first rotating hub including a first gripping surface, the first gripping surface oriented such when the first rotating hub rotates the first gripping surface is opposed to the first gripping area. The apparatus further includes a second rotating hub, mounted in the chassis, the second rotating hub including a second gripping surface, the second gripping surface oriented such when the second rotating hub rotates the second gripping surface is opposed to the second gripping area. The first gripping surface of the first rotating hub rotates towards the first gripping area when the first rotating hub is rotated in a first direction and the second gripping surface of the second rotating hub rotates towards the second gripping area when the second rotating hub is rotated in the first direction. The method further includes running a flat strap around the first rotating hub. The method further includes running the flat strap around a fixed point. The method further includes running the flat strap around the second rotating hub. Optionally, the running the flat strap around the first rotating hub results in the flat strap being inline with the flat strap. In another alternative, the chassis has a first and second side. Furthermore, the first gripping area and the first gripping surface form a first gripping point and the second gripping area and the second gripping surface form a second gripping point. Additionally, the first gripping point has a first entrance and a first exit, the first entrance at a first expected entrance point for a flat strap and the first exit at a first expected exit point for the flat strap, and the second gripping point has a second entrance and a second exit, the second entrance at a second expected entrance point for the flat strap and the second exit at a second expected exit point for the flat strap. Finally, the first exit and the second entrance are on the first side of the chassis. In another alternative, the flat strap is attached at one end to a fixed point such that the running steps result in a point-to-point configuration. In yet another alternative, the flat strap and flat strap holding apparatus are configured in a loop arrangement as a result of the running. Optionally, the method further includes pulling on the flat strap to advance the flat strap in order to tighten the flat strap, the second rotating hub preventing the flat strap from slipping backwards, the flat strap holding apparatus providing a mechanical advantage for the pulling. In one configuration, the mechanical advantage is a 3-to-1 tension advantage.

BRIEF DESCRIPTION OF THE DRAWINGS

FIG. 3A is a bottom oriented perspective view of the backside of the chassis (110) of the embodiment shown in FIG. 1;

FIG. 3B is a perspective view of the front side of the chassis (110) of the embodiment shown in FIG. 1;

FIG. 3C is a front view of the chassis (110) of the embodiment shown in FIG. 1;

FIG. 3D is a back side view of the chassis (110) of the embodiment shown in FIG. 1;

FIG. 4A is a side view of the first of two camlocks (130) used in the embodiment shown in FIG. 1;

FIG. 4B is a front view of the first of two camlocks (130) used in the embodiment shown in FIG. 1;

FIG. 4C is a top front oriented perspective view of the first of two camlocks (130) used in the embodiment shown in FIG. 1;

FIG. 4D is a bottom oriented perspective view of the first of two camlocks (130) used in the embodiment shown in FIG. 1;

FIG. 5 is a bottom oriented perspective view of the first of two camlocks (130) used in the embodiment shown in FIG. 1 showing configured with a torsion spring (136) and a pivot pin (135) used to constrain the camlock (130) and the torsion spring (136) in the chassis;

FIG. 8A is a perspective view of the pins (125, 135) used in the embodiment shown in FIG. 1

FIG. 8B is a front view of the pins (125, 135) used in the embodiment shown in FIG. 1;

FIG. 9 is a perspective view of the first of two torsion springs (126) in a compressed state used in the embodiment shown in FIG. 1;

FIG. 10 is a perspective view of the second of two torsion springs (136) in a compressed state used in the embodiment shown in FIG. 1;

FIG. 17 is a perspective view showing the embodiment from FIG. 1 (100) securing a single strap (330) around a single stationary anchor point (253) in a point-to-point configuration;

FIG. 18 is a front view of FIG. 17 showing the embodiment from FIG. 1 (100) securing a single strap in a loop configuration;

FIG. 19 is a cut away section view per the section view indicators shown in FIG. 18;

FIG. 20 shows a non-configured arrangement of a strap (340) containing a loop on one end secured with stitching (342) and the embodiment from FIG. 1;

FIG. 21 shows the embodiment from FIG. 1 (100) and the sewn strap from FIG. 20 in a secured point-to-point configuration anchored around two sections of pipe (254, 255); the two sections of pipe represent stationary anchors points;

FIG. 24 shows a non-configured setting of the embodiment from FIG. 1 (100) and a strap (360) containing a wire-form hook (194) on one end secured to the strap by a loop secured with stitching (362) and a second wire-form hook (192) captured by the free end of the strap and free to move along the strap;

FIG. 25 shows the non-configured setting of FIG. 24 now in a secured point-to-point configuration where both hooks (192, 194) are anchored to two sections of pipe (258, 259); the two sections of pipe represent stationary anchor points;

FIG. 26 shows the embodiment from FIG. 1 (100) adjustably holding a strap assembly (370) in a point-to-point configuration; the strap assembly uses a single wire-form hook (196) secured to a strap (370) by means of a sewn loop in the strap secured with stitching (372); the hook (196) and the opposite end of the strap (370) are secured around two sections of pipe (260, 261) which in turn represent stationary anchor points;

FIG. 27 shows a non-configured setting of the embodiment from FIG. 1 (100) and a strap assembly (380) containing a gated hook (199) on one end secured to the strap by means of a loop in the strap secured with stitching (382) and a second gated hook (198) captured by the free end of the strap and free to move along the strap assembly; the embodiment from FIG. 1 (100) is shown connected to the strap by means depicted in FIG. 11, and positioned along the strap between the two gated hooks (198, 199); and FIG. 28 shows the non-configured arrangement of FIG. 27 now in a secured point-to-point configuration with the two gated hooks (198, 199) each attached to separate sections of pipe (262, 263); the sections of pipe represent stationary anchor points; and the free end of the strap is secured to the embodiment from FIG. 1 (100) by camlock (130) by means depicted in FIG. 12.

DETAILED DESCRIPTION

Figure 1:
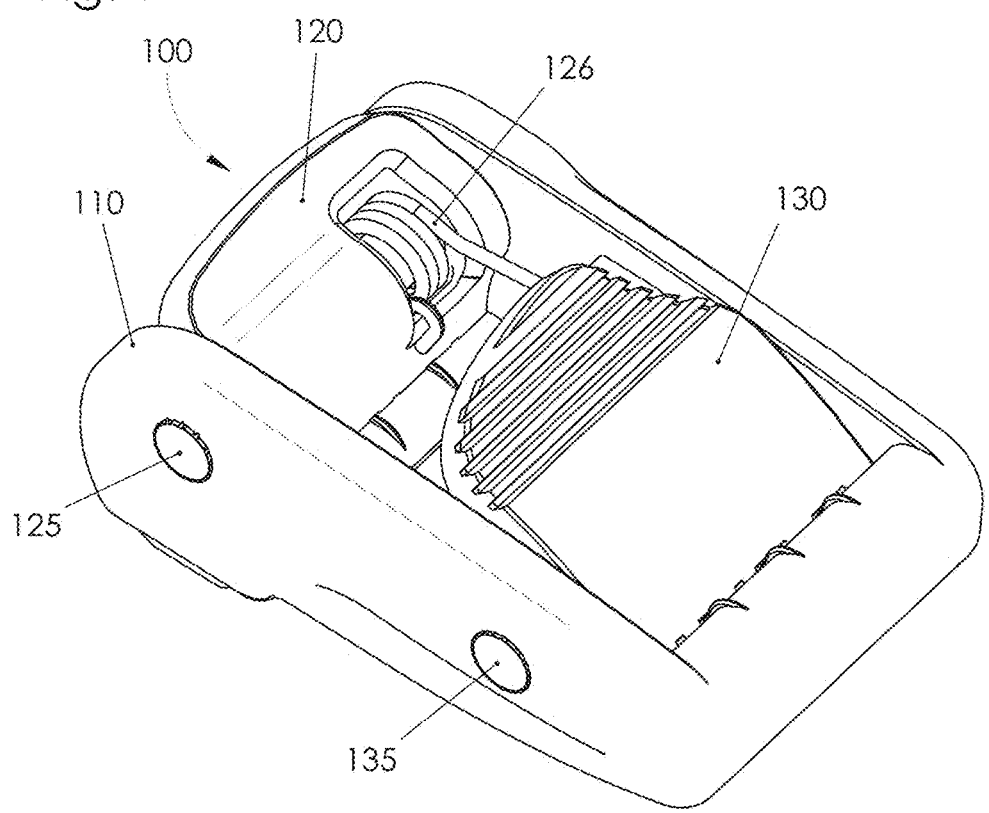
FIG. 1 is a perspective view of an embodiment of an apparatus capable of securing flat strap (100)

Certain terminology is used herein for convenience only and is not to be taken as a limitation on the embodiments of the systems and methods for an inline dual cam tensioning device. Generally, embodiments of the inline dual cam tensioning device include two camlock devices oriented in a single body. The camlock devices are positioned and oriented in relation to each other in order to provide a camlock system with significant advantages over other camlock systems. One such positioning relates to the exit of a first one of the camlocks being on the same side of the chassis as the entrance to the other camlock. This allows for the camlock to be placed in an inline configuration. Furthermore, the pressure surfaces of the camlocks are arranged in an approximately orthogonal arrangement to reduce the size of the inline dual cam tensioning device. Other features of embodiments of the device are discussed herein.

REFERENCE NUMERALS

| Reference Numerals | |
| --- | --- |
| 100 | inline dual cam tensioning device |
| 192 | wire-form hook |
| 194 | wire-form hook |
| 196 | wire-form hook |
| 198 | gated hook |
| 199 | gated hook |
| 251 | section of pipe representing stationary anchor |
| 252 | section of pipe representing stationary anchor |
| 253 | section of pipe representing stationary anchor |
| 254 | section of pipe representing stationary anchor |
| 255 | section of pipe representing stationary anchor |
| 256 | section of pipe representing stationary anchor |
| 257 | section of pipe representing stationary anchor |
| 258 | section of pipe representing stationary anchor |
| 259 | section of pipe representing stationary anchor |
| 260 | section of pipe representing stationary anchor |
| 261 | section of pipe representing stationary anchor |
| 262 | section of pipe representing stationary anchor |
| 263 | section of pipe representing stationary anchor |
| 301 | flat strap |

-continued

| | |
|---|---|
| 302 | flat strap |
| 320 | flat strap |
| 330 | flat strap |
| 340 | flat strap |
| 350 | flat strap |
| 360 | flat strap |
| 370 | flat strap |
| 380 | flat strap |
| 901 | direction arrow |

Components of inline dual cam tensioning device 100

| | |
|---|---|
| 11 | chassis cross-bar, opposite IN-LINE camlock |
| 12 | chassis cross-bar, strap deflector |
| 13 | chassis cross-bar, opposite EXIT camlock |
| 14 | raised ridge on chassis cross bar |
| 15 | rotational stop for IN-LINE camlock |
| 16 | stop for EXIT camlock torsion spring leg |
| 21 | grooved recess |
| 22 | grooved recess |
| 23 | grooved recess |
| 24 | grip tab |
| 25 | end portion of IN-LINE camlock lever |
| 31 | grooved recess |
| 32 | grooved recess |
| 33 | grooved recess |
| 35 | end portion of EXIT camlock lever |
| 41 | raised ridge on pivot pin |
| 42 | bent leg detail on torsion spring |
| 43 | torsion spring leg |
| 44 | torsion spring leg |
| 45 | torsion spring leg |
| 75 | recess to hold torsion spring |
| 77 | transverse cylindrical shaped opening |
| 85 | recess to hold torsion spring |
| 87 | transverse cylindrical shaped opening |
| 91 | opening in chassis, egress for strap exiting embodiment |
| 92 | opening between chassis cross-bar and IN-LINE camlock |
| 93 | opening in chassis, strap ingress to EXIT camlock |
| 94 | opening between chassis cross-bar and EXIT camlock |
| 95 | opening in chassis cross-bar, captures torsion spring leg |
| 97 | opening in chassis, captures pivot pin |
| 99 | opening in chassis, captures pivot pin |
| 110 | embodiment chassis |
| 120 | IN-LINE camlock |
| 125 | IN-LINE camlock pivot pin |
| 126 | IN-LINE camlock torsion spring |
| 130 | EXIT camlock |
| 135 | EXIT camlock pivot pin |
| 136 | EXIT camlock torsion spring |
| 190 | guard strip |

Other parts shown

| | |
|---|---|
| 310 | load bearing portion of configured strap |
| 312 | load bearing portion of configured strap |
| 342 | strap stitching |
| 362 | strap stitching |
| 372 | strap stitching |
| 382 | strap stitching |
| 398 | end of strap |

Figure 2:
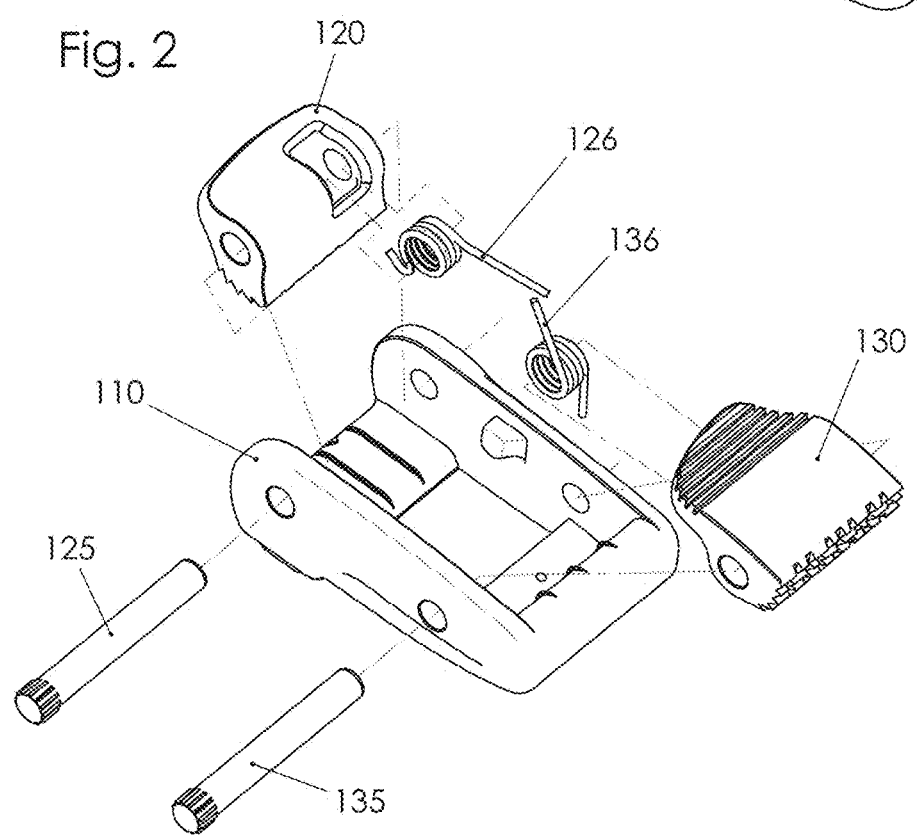
FIG. 2 is an exploded view of the same embodiment shown in FIG. 1 (100)
Figure 6A:
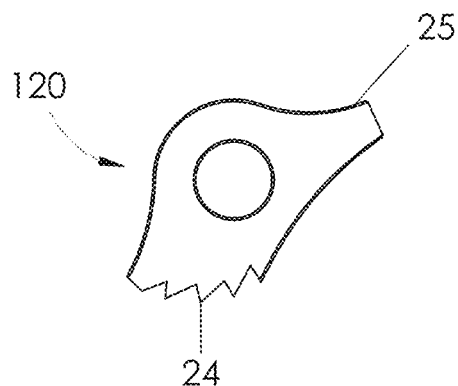
FIG. 6A is a side view of the second of two camlocks (120) used in the embodiment in FIG. 1.
Figure 6C:
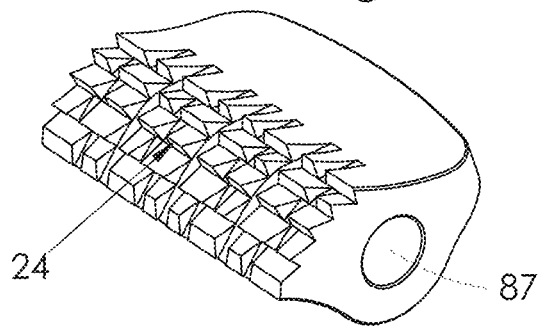
FIG. 6C is a bottom oriented perspective view of the second of two camlocks (120) used in the embodiment shown in FIG. 1
Figure 6B:
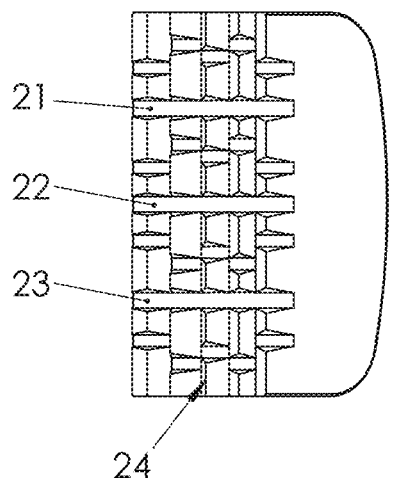
FIG. 6B is a bottom view of the second of two camlocks (120) used in the in FIG. 1.
Figure 6D:
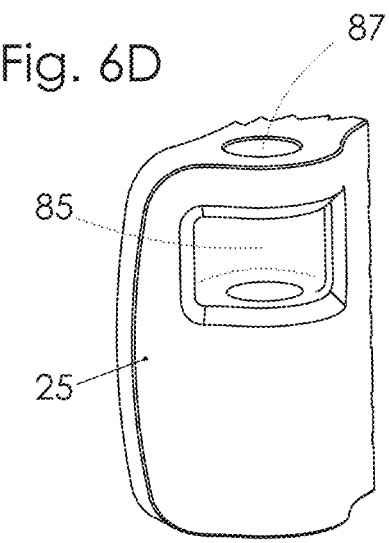
FIG. 6D is a top oriented perspective view of the second of two camlocks (120) used in the embodiment shown in FIG. 1.
Figure 7:
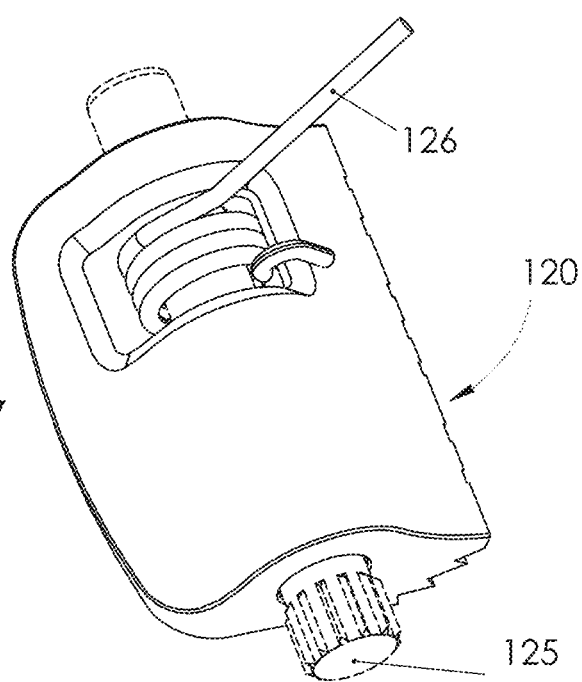
FIG. 7 is a top dominate perspective view of the second of two camlocks (120) used in the embodiment shown in FIG. 1 showing configured with a torsion spring (126) and a pivot pin (125) used to constrain the camlock (120) and the torsion spring (126) in the chassis.

FIG. 1 shows one embodiment of an inline dual cam tensioning device (also referred to as an adjustable strap apparatus) 100 containing two camlock assemblies per apparatus (120, 125, 126 and 130, 135, 136). Generally, FIGS. 1-13 describe this embodiment. Each camlock assembly consists of a lever and camlock hub integrated functionally so as to comprise a single component (120, 130), a torsion spring (126, 136), pivot pin (125, 135) and complimentary cam-locking geometries (11, 13) incorporated into the apparatus' chassis (110). In each camlock assembly the pivot pin is used to secure the torsion spring within the camlock hub/lever and in turn secure both components to the chassis (FIG. 2). The torsion spring is used primarily to bias each camlock to the normally closed position (FIG. 1). Although, particular springs and camlocks are shown in the embodiment of FIG. 1, various springs, pins, levers, and camlocks may be utilized in alternatives.

Figure 11:
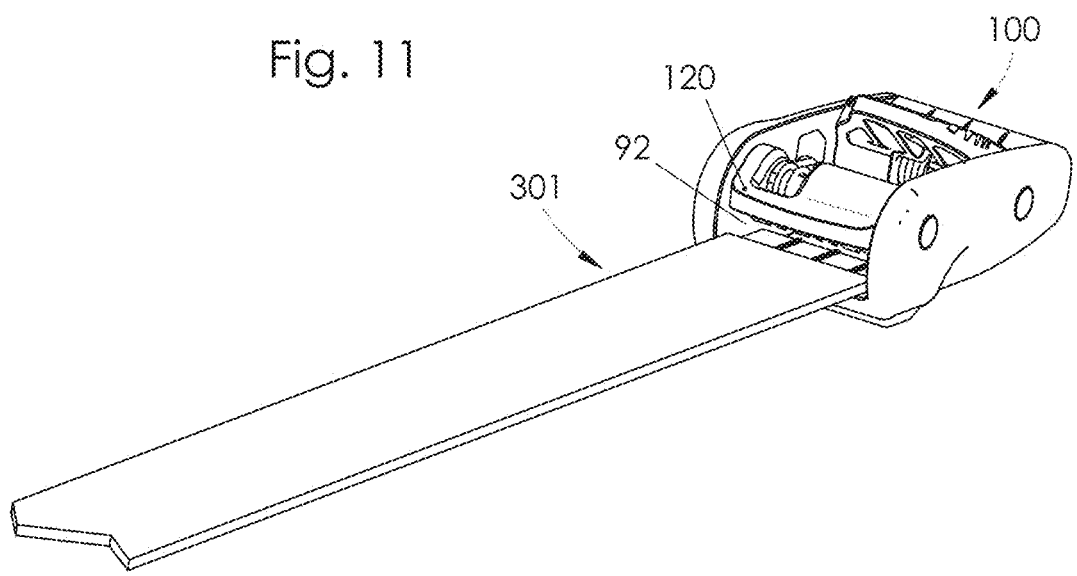
FIG. 11 is a top rear oriented perspective view of a strap (301) being inserted into the opening (92) created between the chassis (110) and the first of two camlocks (120) when the camlock is pressed near the end of the lever portion of the camlock (25)
Figure 12:
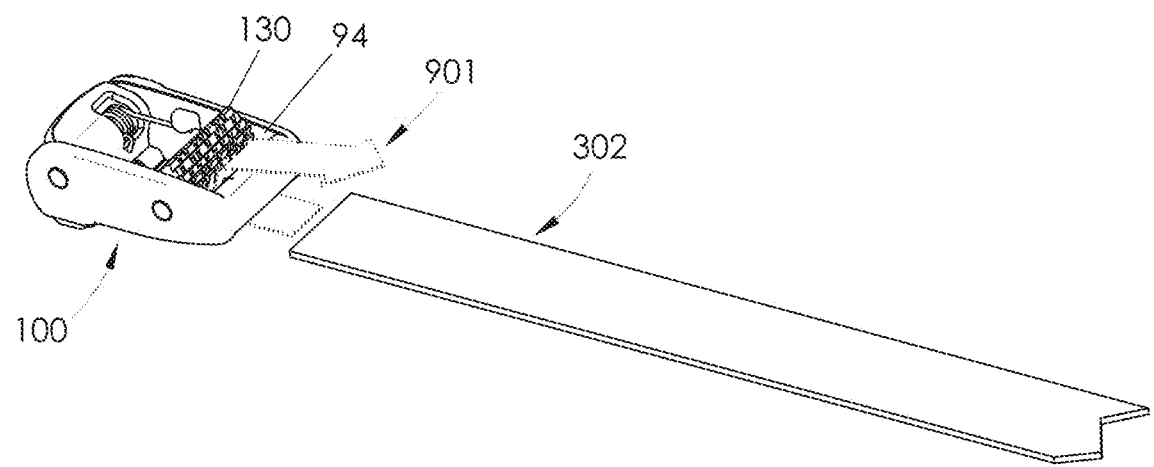
FIG. 12 is a top front oriented perspective view of a strap (302) being inserted into the opening (94) created between the chassis (110) and the second of two camlocks (130) when the camlock is pressed near the end of the lever portion of the camlock (35). The dotted arrow (901) indicates insertion path of the strap.
Figure 13:
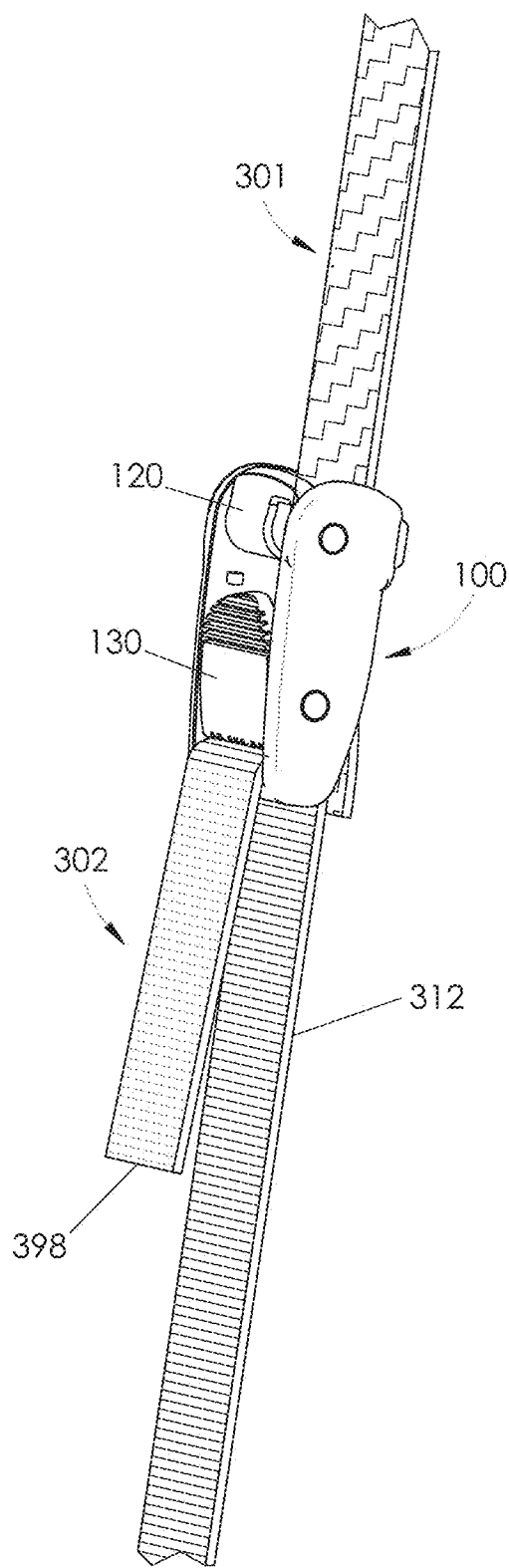
FIG. 13 is a perspective view of two different straps (301, 302) secured in the apparatus (100) showing both camlocks (120, 130) in closed or strap locking positions.

Each camlock can be independently operated by pressing the lever portion of the camlock (25, 35) causing the camlock hub to rotate about a pivot pin thus opening a gap (92, 94) between the camlock hub and chassis cross bar (11, 13). FIGS. 4, 6, 11, and 12. Whenever the gap is present a strap can be inserted into it (FIGS. 11, 12). Removing pressure from the camlock lever allows the torsion spring to rotate the camlock hub back towards a closed position closing the gap and trapping the strap within the device (FIG. 13).

Grip tabs (24, 34) incorporated into each camlock hub (120, 130) provide traction between the strap and the hub resulting in a further biasing effect to close or tighten the locking grips onto the strap (clamping force) whenever tension is applied to the strap along the direction of withdrawal (opposite the insertion direction). Attempts to withdraw the strap by applying tension in a withdrawing direction to the strap will result in a reactive response of the apparatus to tighten the camlock hub onto the strap preventing withdrawal of the strap from the apparatus. A configured strap (one that has been inserted into the apparatus) can be tightened within the apparatus by using the free end of the strap (398, FIG. 13) to draw the strap through the apparatus along the same direction the strap was originally inserted into the apparatus (901, FIG. 12). Whenever tension applied to the strap along the insertion direction exceeds the reactive load on the strap the strap will be drawn further into and through the apparatus. Applied tension on the strap can be removed by applying pressure to either camlock lever until the camlock hub rotates to an open position thus releasing the clamping force on the strap and the strap from the apparatus.

In the embodiment shown in FIG. 1 the camlock assemblies differ from one another and perform different camlock actions within the apparatus (120, positional placement on the strap and 130, strap tensioning). To differentiate between the two camlock assemblies they are referred to as the 'IN-LINE' (120, 125, 126) and 'EXIT' (130, 135, 136) camlock assemblies. Thus the embodiment shown in FIG. 1 consists of an IN-LINE and EXIT camlock assembly housed in a custom chassis.

The embodiment in FIG. 1 has been designed to accommodate 1" wide straps but could be scaled to function with other strap widths—narrower or wider than 1". Load bearing capabilities of 1" wide strap are typically rated under 5,000 lbs. and hence lend themselves to apparatuses fabricated from metal die-cast materials. Thermoplastics with or without fiber additives could also be used and would be ideally suited for apparatuses sized to work with ¾" wide and smaller strap. Metal stampings would be another method that could be utilized in fabricating components for the apparatus. The pivot pins would typically be fabricated from stainless steel or a higher strength steel alloy and the torsion springs could be fabricated from either stainless steel wire or high-tempered steel commonly known as music wire.

The apparatus can be released from the strap, hence it is not sewn or otherwise permanently attached to the strap. As such, various types and thicknesses of straps can be interchangeably used with the apparatus. Accordingly the embodiment of the apparatus used with 1" wide straps has been designed to accommodate straps ranging in thickness from 0.020" to 0.105" requiring neither alterations nor adjustments be made to the apparatus in changing from one thickness of strap to another. The apparatus is compatible with straps that utilize either polyester, nylon, or polypropylene filaments woven in a flat or flattened tubular construction.

Operation—FIGS. 4C, 6D, 11-128

The IN-LINE camlock enables the apparatus to be secured positionally (while in a no-load state) anywhere along the length of a strap (320-380, FIGS. 14-28) while the EXIT camlock enables tensioning of the load restraining portion of the strap within the device (312). The EXIT camlock tensioning action is similar to the camlock action that sewn-strap camlock devices employ.

The IN-LINE camlock positioning action is the primary innovation of the apparatus. The combination of the two camlock actions, IN-LINE device positioning and EXIT strap tensioning create a synergy of functionality that to date have not been employed by other adjustable strap devices.

Embodiments of the apparatuses may be used in multiple configurations, including two configurations shown in the figures: a loop configuration (FIGS. 14-16) and a point-to-point configuration (FIGS. 17-19, FIGS. 20-28). The loop configuration is the configuration more commonly associated with sewn-strap devices (where one end of the strap is secured to a camlock device by means of a sewn loop). The point-to-point configuration is more commonly associated with ratchet tensioning devices. Ratchet devices typically utilize two straps with the ratchet tensioning mechanism positioned between and connecting the two strap lengths. As with sewn-strap devices, ratchets devices typically have one end of one strap permanently affixed to the device.

Figure 14:
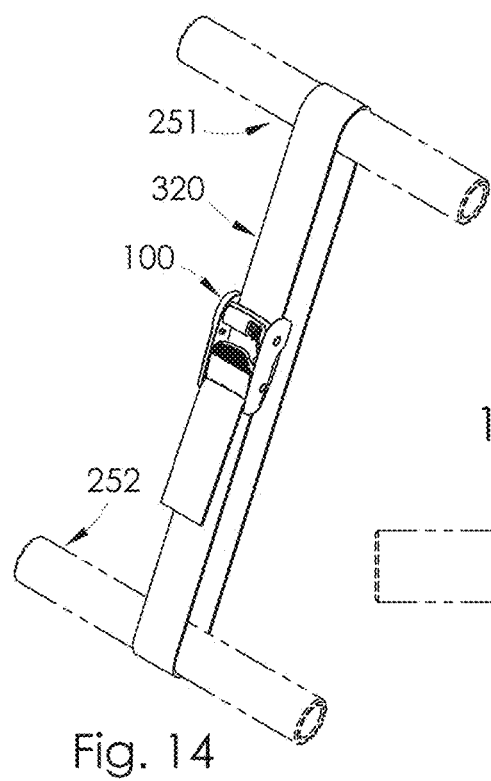
FIG. 14 is a perspective view showing the embodiment from FIG. 1 (100) securing a single strap (320) around two stationary anchor points (251, 252) in a loop configuration.
Figure 15:
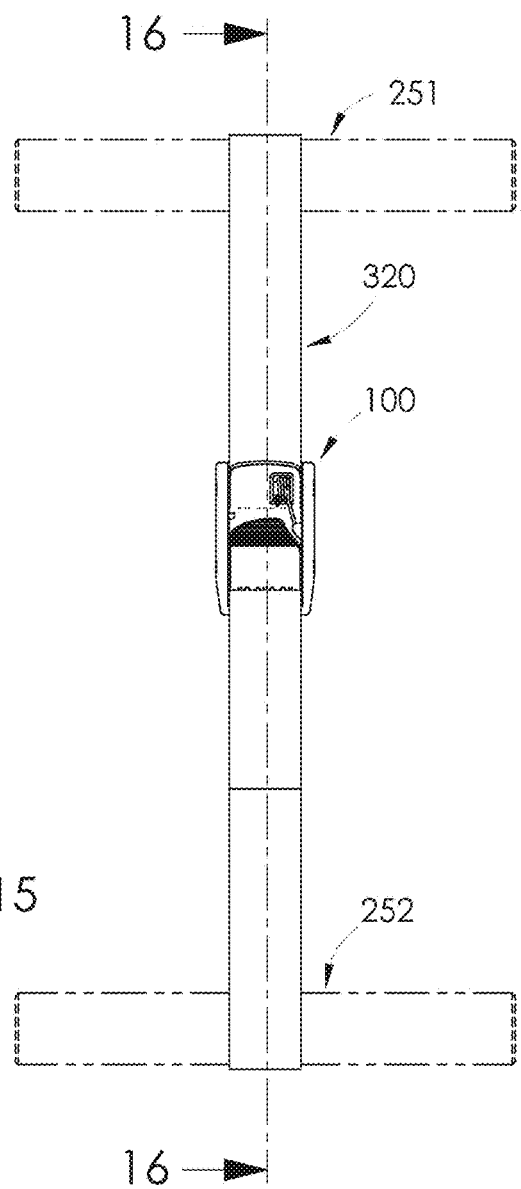
FIG. 15 is a front view of FIG. 14 showing the embodiment from FIG. 1 (100) securing a single strap in a loop configuration.

In the loop configuration a single strap exits the apparatus through the IN-LINE camlock portion of the device, traverses to a first, second, or multiple anchor points and is then routed back through and secured in the apparatus by means of the EXIT camlock (FIG. 14). This particular arrangement for the ends of the strap captured in the apparatus could also be utilized when connecting separate straps end for end (FIG. 13).

In the point-to-point configuration a single strap passes from a first anchor point through the IN-LINE camlock portion of the apparatus to then exit the apparatus to a second anchor point and is routed back through and secured in the apparatus by means of the EXIT camlock (FIG. 17).

In both configurations the strap is tightened within the apparatus by applying tension to the free end of the strap extending from the EXIT camlock assembly. Pressing the release lever of either camlock assembly opens the camlock to allow insertion or removal of the webbing. Thicker webbing is accommodated by increasing the displacement of each lever when opened.

In the normally closed position each camlock permits movement of the strap through the apparatus in one direction only. The arrangement of the camlocks in the apparatus is such that they work in opposition to each other. The IN-LINE camlock when closed prevents movement of the strap out of the apparatus. The EXIT camlock when closed prevents movement of the strap into the apparatus. Thus a closed IN-LINE camlock will prevent any movement of strap back through the apparatus as strap is drawn through the EXIT camlock. Conversely while the EXIT camlock remains closed slack is removed from the strap as the apparatus is moved along the strap in the direction of the IN-LINE camlock.

The pathway of the webbing through the apparatus determines whether the apparatus is configured in the loop configuration or the point-to-point configuration. Thus the specific configuration of the webbing in the apparatus coupled to the combinatorial effect of the camlock actions creates a versatile apparatus that can interchangeably utilize a variety of webbing types.

The tensioning capability in a loop configuration of the apparatus compared to that of a sewn-strap camlock device is essentially the same. However in making comparisons between the two it is obvious that a sewn-strap camlock device is limited to a single strap of specific thickness, length and material (strength). The apparatus describe herein can interchangeably accommodate straps of varying lengths, thicknesses and materials—a major differentiator as compared to the sewn-strap camlock device.

The tensioning capability in a point-to-point configuration of the apparatus compared to either a sewn-strap device (utilizing one or two straps) or a ratchet device is truly where the apparatus comes into its own. Point-to-point configurations that utilize sewn-strap camlock devices can at best achieve a 2-to-1 tensioning advantage. The apparatus described herein produces a 3-to-1 tension advantage making the apparatus comparable to leverage amplifying ratchet devices yet occupying a significantly smaller physical volume.

Ratchet devices designed for use with F' wide strap commonly limit maximum working loads to approximately 500 lbs. To accommodate strap that is spooled onto the ratchet hub these devices tend to use thinner straps. Ratchet devices also tend to be large and heavy adding unnecessary weight at a localized position on the strap which in itself can induce unwanted dynamic loading.

In a point-to-point configuration 170 lbs. of force applied to the exit end of webbing (398) in the apparatus as configured in FIG. 17 will generate approximately 510 lbs. of induced tension in the load bearing portion of the strap (310). 170 lbs. is not a small number but can readily be achieved by a 200 lb. person. Applied tensioning forces of 50 lbs. are easily accomplished and can result in induced load securing forces approximating 150 lbs.

Another distinct advantage of the apparatus is that it can be positioned easily anywhere along the length of the configured strap (FIGS. 20-25). Ratchet devices utilize a short strap for the strap portion permanently affixed to the device. This requires the tensioning mechanism to reside near one end of the strap configuration when used in a load restraining situation. For ratchet devices this may not be an issue as access to the ratchet lever is required to tighten the strap anyway. The apparatus as shown in FIGS. 20-25 has neither of these restrictions.

Ratchet devices have a fixed capacity on the take up spool which limits the amount of strap that can be held in the device. Because of this, these types of devices targeted for use with 1" wide strap tend to use thinner strap material with lower load bearing capacity as compared to the straps that can be easily accommodated in the apparatus described herein. So as with sewn-strap camlock devices, and unlike the apparatus describe herein, ratchet devices are limited to using the straps they are originally supplied with.

One significant difference between the apparatus described herein and other ratchet style tensioning devices is ease of use. Ratchet devices are complicated and unless one is familiar with the operation of the specific ratchet device, applying tension to the webbing in the device can become aggravatingly frustrating. For the apparatus described herein tension is applied to the free end of webbing extending from the EXIT camlock until the desired level of tension in the apparatus is achieved.

Releasing applied tension in a strap configured in the apparatus requires only the push of a lever. Or more specifically the push of either of two levers either of which can be thumb activated. Of particular significance is that while the locking action of the two camlocks work in opposing directions the release actions required to operate the camlock levers are identical directionally. Both levers can be engaged from the same hand position—a nice feature in terms of ergonomics.

The IN-LINE camlock and the EXIT camlock utilize the same locking mechanism. Grip geometries residing on each camlock (24, 34) are positioned eccentrically with respect to the camlock pivot axis so that rotation of the camlock moves the grip geometries either into the strap (creating a clamping force on the strap between the camlock and the device housing) or away from the strap (allowing movement of the strap through the device).

To release strap that is locked in the apparatus (wedged between a camlock and chassis) sufficient torque is induced in the camlock by means of applying pressure to the camlock lever. Pressure applied to the camlock lever will create rotation of the camlock in a direction opposite from that which resulted in the webbing being locked in the apparatus.

Force applied to a short lever generates less torque compared to that same force applied to a longer lever. The IN-LINE camlock lever is shorter in length than the EXIT camlock lever to intuitively direct someone using the device to the appropriate lever for the task at hand. Since the IN-LINE cam is used when positioning the apparatus along the strap in no-load conditions (initial set-up of the configuration) only enough torque to overcome the torsion spring biasing the lever to a closed position is required. Hence its lever is significantly shorter than the EXIT camlock lever. Under load conditions only the longer EXIT camlock lever is utilized to release the higher levels of tension in the strap.

To reduce the size of the apparatus the locking actions of the two camlocks are arranged to function in different planes rotated approximately 90 degrees with respect to each other. The locking action of the EXIT camlock (130) is arranged approximately perpendicular to axial direction of the configured webbing in the apparatus whereas the IN-LINE camlock (120) action is generally in-line with the axial direction of the configured strap. This arrangement allows the much longer EXIT camlock lever (35) to lie flat within the apparatus while the smaller IN-LINE camlock is oriented to create minimal webbing displacement along the path of the strap. Both aspects contribute to making the volume of the apparatus compact (FIG. 13).

Figure 16:
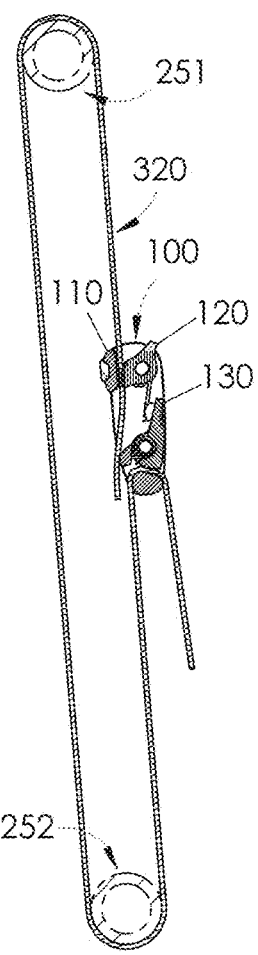
FIG. 16 is a cut away section view per the section view indicators shown in FIG. 15.
Figure 22:
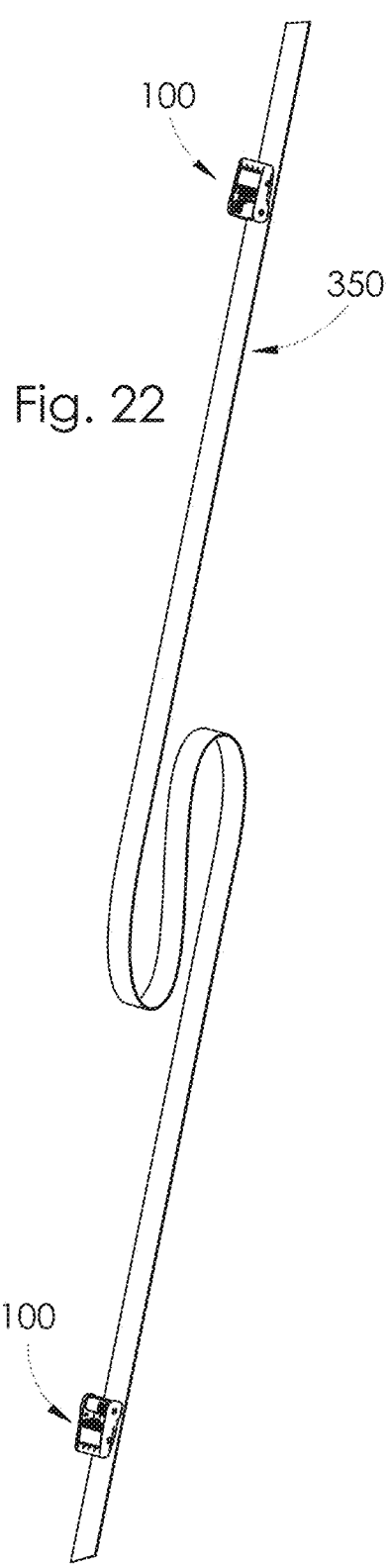
FIG. 22 shows a non-configure arrangement of two units of the embodiment from FIG. 1 (100) and a strap (350)
Figure 23:
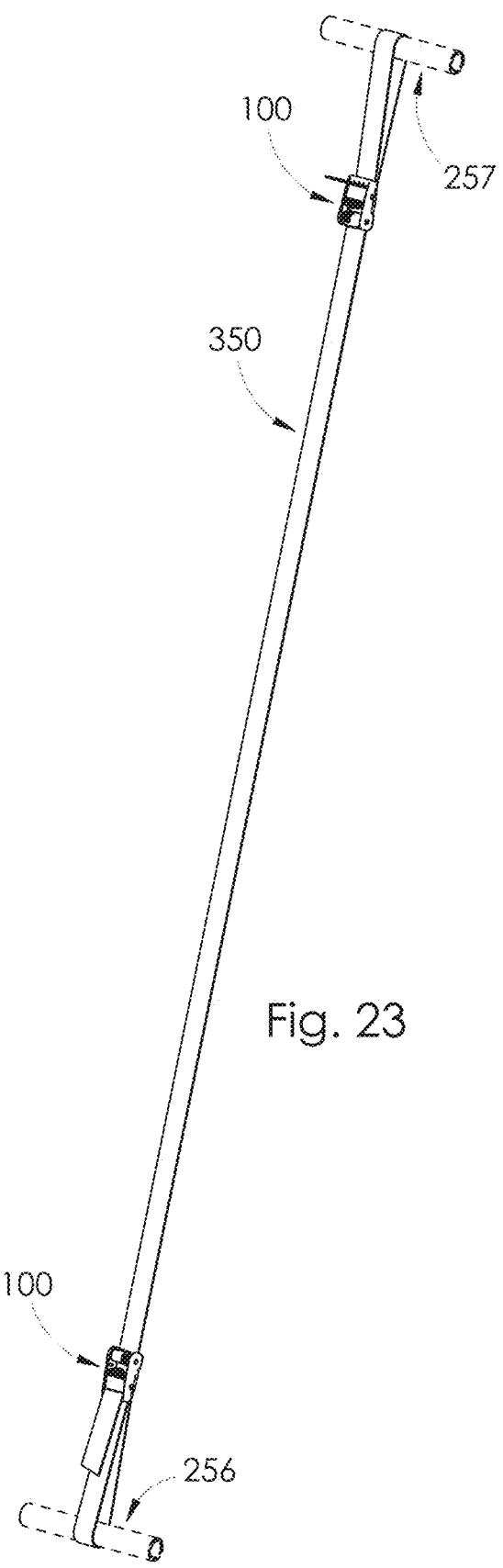
FIG. 23 shows the two units and the strap from FIG. 22 in a secured point-to-point configuration anchored around two sections of pipe (256, 257); the two sections of pipe represent stationary anchors points.

It is also the angular difference between the two camlock actions that enables the apparatus to be used with a single strap in either a loop configuration or a point-to-point configuration (FIGS. 16, 19). A sewn-strap camlock device utilizing a single strap while similar in size to the apparatus described herein requires twice the webbing to accomplish point-to-point configurations. The ratchet device while designed specifically for point-to-point configurations is a much larger device compared to the apparatus described herein.

Rather than staggered diamond points as typically used on other camlock devices the grip geometries on the apparatus' camlocks consist of a non-regular pattern of directional tabs. The shape of the camlock contact region is the same for both camlocks and has been specifically tuned to maximize the number of grip tabs (24, 34) contacting the strap. This creates a highly effective clamping force across the full range of strap thicknesses the apparatus can accommodate. This also enables a broad disbursement of the clamping force when applied to the strap without compromising the overall locking force generated between the camlock and apparatus chassis.

Additionally, through both camlock regions three ridges (14) on the chassis (110) and complimentary mating valleys (21-23, 31-33) on the camlocks (120, 130) run axially to the strap. These ridge/valleys induce greater deformation in thin straps which enhances engagement between the strap and the camlocks while having little to no effect on thick straps. Thick straps by means of thickness alone adequately engages the camlock grip tabs (24, 34). These features improve the apparatus' ability to accommodate a varied selection of strap thicknesses.

In some embodiments, an additional enhancement is incorporated into the apparatus. To protect surfaces to which the apparatus may come into contact a low durometer post-molded or peel-n-stick elastomeric guard strip (190) could be applied to the back side of the chassis (110) opposite the IN-LINE camlock (FIGS. 3A, 3D). Apart from this particular area of the apparatus the rest of the chassis would be buffered from potential contact surfaces by the strap configured in the device.

While specific embodiments have been described in detail in the foregoing detailed description, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein but is intended to cover modifications within the spirit and scope thereof as defined by the appended claims and any and all equivalents thereof.

What is claimed as new and desired to be protected by Letters Patent of the United States is:

1. A flat strap holding apparatus, comprising:
   a one-piece chassis, the one-piece chassis including a first gripping area and a second gripping area, the first gripping area having a first insertion direction and a first withdrawal direction, the second gripping area having a second insertion direction and a second withdrawal direction, wherein the first insertion direction is opposite the second insertion direction, the first and second insertion directions being insertion directions for one or more flat straps and the first and second withdrawal directions being withdrawal directions for the one or more flat straps;
   a first rotating hub, mounted in the one-piece chassis, the first rotating hub including a first gripping surface opposing a first planar surface of the one-piece chassis to define the first gripping area, the first gripping surface oriented such when the first rotating hub rotates the first gripping surface is opposed to the first planar surface, the first rotating hub rotating in a first direction to secure a portion of the one or more flat straps between the first gripping surface and the first planar surface; and
   a second rotating hub, mounted in the one-piece chassis, the second rotating hub including a second gripping surface opposing a second planar surface of the one-piece chassis to define the second gripping area, the second gripping surface oriented such when the second rotating hub rotates the second gripping surface is opposed to the second planar surface, the second rotating hub rotating in the first direction to secure another portion of the one or more flat straps between the second gripping surface and the second planar surface,
   wherein the first rotating hub and the second rotating hub are inline,
   and wherein the first planar surface of the first gripping area is at a non-parallel angle to the second planar surface of the second gripping area.

2. The apparatus of claim 1, wherein the chassis has a first and second side;
   wherein the first planar surface and the first gripping surface form a first gripping point and the second planar surface and the second gripping surface form a second gripping point;
   wherein the first gripping point has a first entrance and a first exit, the first entrance at a first entrance point for a flat strap and the first exit at a first exit point for the flat strap, and the second gripping point has a second entrance and a second exit, the second entrance at a second entrance point for the flat strap and the second exit at a second exit point for the flat strap;
   wherein the first exit and the second entrance are on the first side of the chassis.

3. The apparatus of claim 2, wherein the first side of the chassis includes a guard strip.

4. The apparatus of claim 1, wherein the first and second planar surfaces include a plurality of ridges and the first and second gripping surfaces include a plurality of mating valleys, the plurality of ridges aligned in a complementary fashion with the plurality of mating valleys.

5. The apparatus of claim 2, wherein the first and second gripping surfaces each include a gripping pattern.

6. The apparatus of claim 5, wherein the gripping pattern is a non-regular pattern of directional tabs.

7. The apparatus of claim 6, wherein the directional tabs are shaped such that the directional tabs form an inclined plane in relation to the first entrance and the second entrance, such that the flat strap is ramped over the directional tabs upon insertion.

8. The apparatus of claim 7, wherein the directional tabs are shaped such that the directional tabs form an approximately perpendicular plane in relation to the first exit and the second exit.

9. A flat strap holding apparatus, comprising:
   a rigid chassis, the rigid chassis including a first gripping area and a second gripping area;
   a first camlock, mounted in the rigid chassis, the first camlock normally closed, the first camlock including a first gripping surface opposing a first planar surface of the rigid chassis to define the first gripping area, the first gripping surface oriented such when the first camlock rotates the first gripping surface is opposed to the first planar surface; and
   a second camlock, mounted in the rigid chassis, the second camlock normally closed, the second camlock including a second gripping surface opposing a second planar surface of the rigid chassis to define the second gripping area, the second gripping surface oriented such when the second camlock rotates the second gripping surface is opposed to the second planar surface, wherein the first camlock and the second camlock are inline, the first gripping area having a first insertion direction and a first withdrawal direction and the second gripping area having a second insertion direction and a second withdrawal direction, wherein the first insertion direction is opposite the second insertion direction, the first and second insertion directions being insertion directions for one or more flat straps and the first and second withdrawal directions being withdrawal directions for the one or more flat straps,
   wherein the first camlock rotates in a first direction to secure a portion of the one or more flat straps between the first gripping surface and the first planar surface, and the second camlock rotates in the first direction to secure another portion of the one or more flat straps between the second gripping surface and the second planar surface,
   wherein the first planar surface of the first gripping area is perpendicular to the second planar surface of the second gripping area.

10. The apparatus of claim 9, wherein the chassis has a first and second side;
    wherein the first planar surface and the first gripping surface form a first gripping point and the second planar surface and the second gripping surface form a second gripping point;
    wherein the first gripping point has a first entrance and a first exit, the first entrance at a first expected entrance point for a flat strap and the first exit at a first expected exit point for the flat strap, and the second gripping point has a second entrance and a second exit, the second entrance at a second expected entrance point for the flat strap and the second exit at a second expected exit point for the flat strap;
    wherein the first exit and the second entrance are on the first side of the chassis.

11. A method of using a flat strap, the method comprising:
    providing a flat strap holding apparatus, the flat strap holding apparatus including:
      a chassis, the chassis including a first gripping area and a second gripping area;
      a first rotating hub, mounted in the chassis, the first rotating hub including a first gripping surface opposing a first planar surface of the chassis to define the first gripping area, the first gripping surface oriented such when the first rotating hub rotates the first gripping surface is opposed to the first planar surface;
      a second rotating hub, mounted in the chassis, the second rotating hub including a second gripping surface opposing a second planar surface of the chassis to define the second gripping area, the second gripping surface oriented such when the second rotating hub rotates the second gripping surface is opposed to the second planar surface,
      wherein the first rotating hub and the second rotating hub are inline, the first gripping area having a first insertion direction and a first withdrawal direction and the second gripping area having a second insertion direction and a second withdrawal direction,
      wherein the first insertion direction is opposite the second insertion direction, the first and second insertion directions being insertion directions for one or more flat straps and the first and second withdrawal directions being withdrawal directions for the one or more flat straps,
      wherein the first rotating hub rotates in a first direction to secure a portion of the one or more flat straps between the first gripping surface and the first planar surface, and the second rotating hub rotates in the first direction to secure another portion of the one or more flat straps between the second gripping surface and the second planar surface,
      wherein the first planar surface of the first gripping area is at a non-parallel angle to the second planar surface of the second gripping area;
    running a flat strap around the first rotating hub;
    running the flat strap around a fixed point;
    running the flat strap around the second rotating hub; and tightening the flat strap, the first planar surface of the first gripping area remaining at the non-parallel angle to the second planar surface of the second gripping area when the flat strap is tightened.

12. The method of claim 11, wherein the running the flat strap around the first rotating hub results in the flat strap being inline with the flat strap.

13. The method of claim 11, wherein the chassis has a first and second side;
wherein the first planar surface and the first gripping surface form a first gripping point and the second planar surface and the second gripping surface form a second gripping point;
wherein the first gripping point has a first entrance and a first exit, the first entrance at a first expected entrance point for a flat strap and the first exit at a first expected exit point for the flat strap, and the second gripping point has a second entrance and a second exit, the second entrance at a second expected entrance point for the flat strap and the second exit at a second expected exit point for the flat strap;
wherein the first exit and the second entrance are on the first side of the chassis.

14. The method of claim 11, wherein the flat strap is attached at one end to a fixed point such that the running steps result in a point-to-point configuration.

15. The method of claim 11, wherein the flat strap and flat strap holding apparatus are configured in a loop arrangement as a result of the running.

16. The method of claim 11, further comprising:
pulling on the flat strap to advance the flat strap in order to tighten the flat strap, the second rotating hub preventing the flat strap from slipping backwards, the flat strap holding apparatus providing a mechanical advantage for the pulling.

17. The apparatus of claim 1, wherein the first planar surface of the first gripping area is approximately perpendicular to the second planar surface of the second gripping area.

18. The apparatus of claim 1, wherein the angle is approximately ninety degrees.

* * * * *